Jan. 22, 1957  C. H. INGWER ET AL  2,778,652
CHUCK JAWS
Filed Feb. 24, 1955
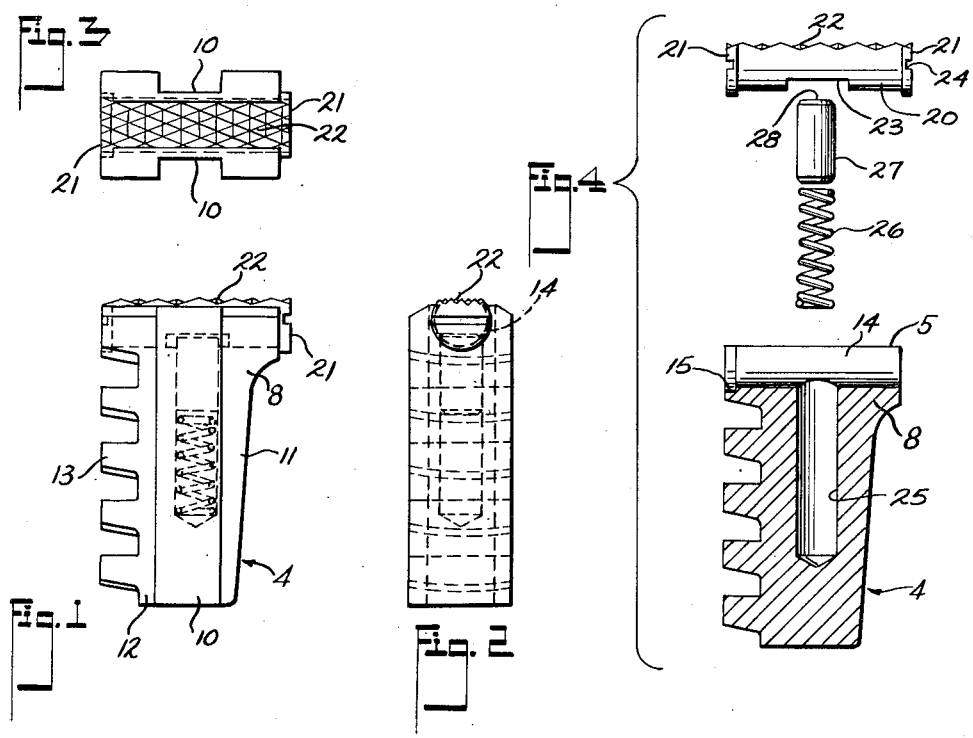
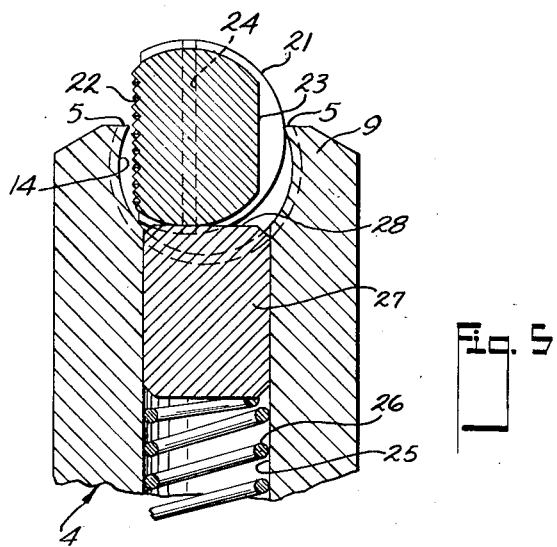
INVENTOR.
CARL H. INGWER
BY & ANTON J. JANIK
ATTORNEY

United States Patent Office 2,778,652
Patented Jan. 22, 1957

2,778,652

CHUCK JAWS

Carl H. Ingwer and Anton J. Janik, Elyria, Ohio, assignors to The Ridge Tool Company, Elyria, Ohio Application February 24, 1955, Serial No. 490,274

7 Claims. (Cl. 279—123)

This invention relates to improvements in chucking devices and more particularly to a work holding jaw for a chuck.

As is well known to those versed in the art, it is common practice to provide chucks having two or more jaws which are moved simultaneously in a radial direction by some suitable means such as a scroll plate or by individual screw adjustments, to advance the jaws into gripping engagement with a work piece. The jaws thus grip the work piece and in time these gripping surfaces become worn, requiring replacement of the jaws. The jaws, when the chucks are used for a power pipe threading device, because of the manner of their use, require more frequent replacement. Obviously, replacement of the jaws is expensive.

The present invention contemplates the provision of a removable work engaging portion for the jaws which, when worn, can be replaced quickly and easily without disassembly of the chuck, and without the use of any special tools.

In addition to the economies of being able to replace the jaw insert the action of the jaw insert is such as to provide a tighter gripping of the work piece, automatically gripping the work piece tighter when it tries to slide between the jaws.

Although replaceable jaw inserts have been known prior to the present invention there were various disadvantages to these prior devices which the present invention overcomes. As an example, some of the prior devices were difficult to assemble in the jaws requiring a complete dismantling of the jaws from the chuck in some instances, and the use of special tools.

Other jaws that were constructed so that the insert could easily be removed were such that the inserts sometimes were displaced from the jaws accidentally. In pipe threading machines where the pipe being threaded is held by a chuck, very frequently the act of inserting the pipe into the chuck causes end contact of the pipe with the chuck jaws, and when the chuck jaw insert was movable longitudinally into the position the pipe would strike them and move them out of their seats. In such a device a particularly rugged chuck is indicated and one which will withstand a considerable amount of abuse.

In the device of the present invention, the jaw insert cannot be accidentally dislodged by end contact with a work piece. The structure of the jaw insert and the manner of its mounting is such that the gripping face moves in its seat when torque is applied to the work piece against the torque being applied to the jaws to cause a tilting of the work face increasing the holding power on the work piece. Furthermore, the structure is such that the holding power increases regardless of the direction of the torque. This is particularly desirable because very frequently such devices are used to rotate the work in a direction opposite to the normal direction when cutting left hand threads.

Still other advantages of the invention and the invention itself will become more apparent from the following description of an embodiment thereof, which description is illustrated by the accompanying drawings and forms a part of the specification.

In the drawings:

Fig. 1 is a side elevational view of a chuck jaw and showing in dotted lines certain parts which would otherwise be hidden;

Fig. 2 is an end elevational view thereof;

Fig. 3 is a plan view looking into the grip holding face;

Fig. 4 is an exploded view with the main chuck jaw body being shown in vertical section; and Fig. 5 is an enlarged fragmentary view showing the chuck jaw insert in the process of being inserted into the jaw.

Referring to the drawings, throughout which like parts have been designated by like reference characters, briefly our invention comprises the formation of a semicylindrical seat in the jaw face in which a semicylindrical jaw member is inserted, the seat being opened beyond the diameter of the cylinder to provide a restricted opening and the jaw insert being such that it is rotated when placed into the opening to lock it in the opening. End flanges on the jaw insert engage with the front and rear portions of the jaw to prevent longitudinal movement. Means is provided to resiliently hold the jaw in a predetermined position and still permit it to oscillate.

As can best be seen in Fig. 1, the chuck jaw includes a body 4 having a pair of vertical ways 10 bounded by flanges 11 and 12 to provide interlocking sliding engagement with a scroll plate. The rear face of the body is provided with curved teeth 13 for interengagement with the lands of the scroll plate and by means of which the jaws are advanced and retracted in a manner well known to those versed in the art.

It should be pointed out that the structure so far described is old and well known in the art, the particular jaw being one which is useful in a chuck in a pipe threading machine or, for that matter, any other type of chuck, and that the drawings are for the purpose of illustrating the invention and not by way of limitation, since the invention will be useful in many other types of jaws such as those having individual screw adjustments and any of the other well known types of adjustments. It will be appreciated also that more than two jaws may be used although the more common practice indicates a universal type of chuck where three jaws are used.

At the upper end 8 of the jaw body, as is currently shown in Figs. 1 and 4, the jaw is provided with a work engaging end, usually of a substantially greater length from front to the rear than the remainder of the jaw in order to provide a greater work engaging surface. The upper extremity of the jaw 9, Fig. 5, is provided with a semicylindrical jaw insert seat 14 extending longitudinally of the jaw face and opening through the face and each end. Preferably, the inner end of this seat is provided with a counterbore 15, Fig. 4, coaxial with the seat 14 for the reception of a flange 21 on the jaw insert and to prevent it overhanging the inner end of the jaw and interfering with the operation of the scroll plate.

The jaw insert comprises a substantially cylindrical body 20 having a pair of end flanges 21. One side of the body is milled off along a cord and the surface provided with a series of longitudinal grooves defining teeth or, as best disclosed in Fig. 3, a plurality of diamond shaped teeth which forms a work gripping surface 22. Opposite the work gripping face 22 on the other side of the insert a flat 23, Fig. 4, is milled. The flat is in parallelism with the jaw face and may extend approximately one-third the length of the jaw although it may be shorter or longer, since the purpose of it is to provide for engagement with a resilient centering device to hold the jaw face 22 substantially perpendicular to the center line of the jaw and still permit it to oscillate when desired.

A relationship is provided between the jaw insert and the seat such that the jaw insert must be inserted from the upper end of the jaw sideways in a position as shown in Fig. 5 and then rotated to hold the jaw in position as shown in Fig. 2. This indicates that the jaw seat which opens through the end of the jaw should have its diametrical center line disposed below the upper edges of the jaw defining the opening. It will be obvious that if this opening was at the center line the jaw would fall out and that the further the opening is continued above the center line the greater the holding power for holding the jaw insert. Obviously a limit is reached where the jaw cannot be inserted. As shown in the drawings, the edges 5 of the seat 14 extend above the diametrical center line of said seat a distance approximately one-half the radius. In any case, the diameter of the jaw is very closely the same as the diameter of the seat. Obviously a very slight difference in diameter must be present otherwise the jaw cannot rotate or oscillate freely in the seat. The thickness of the jaw, that is, the distance from the jaw face 22 to the diametrically opposite side on the surface of body 20 is determined by the distance between the edges 5 of the jaw seat and should be substantially the same. It will be appreciated that the farther the jaw seat can be extended beyond the center line of the cylinder seat the more holding power is provided for the jaw. In the particular structure shown it will be noted that the face of the jaw insert extends slightly above the upper surface of the body 4 which is highly desirable for purposes which will be hereinafter more fully described.

The ends of the jaw insert are provided with slots 24 which may receive a screw driver or other instrument to enable the same to be turned manually. The bottom of the jaw seat 14, Fig. 4, communicates with a blind hole 25. One end of a helical spring 26 seats in the bottom of the blind hole and the other end is in engagement with a cylindrical plunger 27 having flat ends 28, one of which is adapted to engage with the flat 23 on the insert, note particularly Fig. 1.

As can best be seen in Fig. 5 the jaw insert is inserted by rotating the flat 23 of said insert parallel to the vertical center line of the jaw body and inserting it into the seat. After it has been inserted into the seat it is pressed downward to move the plunger 27 and compress the spring 26, after which it may be rotated by a screw driver placed in the slot 24 into the position shown in Fig. 2. At this time the flat surface 28 on the plunger 27 engages with the flat 23 on the jaw insert and keeps it from rotating in the seat holding the work gripping surface 22 of the jaw insert in the proper position, i. e., normal to the center line of the jaw, for engagement with the work piece.

The flanges 21 on the end of the jaw insert prevent longitudinal movement of the jaw in the seat. The one flange seats in the counterbore 15, Fig. 4, and the other flange overhangs the face of the jaw body as shown in Fig. 1.

When the jaws are in a chuck and advanced into engagement with the work piece, should the work piece be cylindrical, it will engage the gripping surface 22 of the jaw insert tangent thereto. Assuming that the chuck is being rotated and that a thread is being cut on the pipe which is being held by the chuck, the countertorque applied by the pipe threading tool has a tendency to roll the pipe over the gripping surface of the jaw insert and when it does, said insert is rotated within said seat and one side of the gripping surface 22 is carried upward into pressure engagement with said work piece exerting a greater holding power on the work piece. Thus regardless of the direction that the chuck is turning and the direction of the opposing torque due to a cutting operation the jaw insert will rotate in the direction of the unbalanced torque sufficiently to increase the holding power of the chuck particularly if there is any tendency of the work piece to want to rotate in the chuck, thus an increased gripping action is exercised which operates to an advantage.

Should it be desired to replace the jaw insert with a new jaw insert it is merely necessary to insert a screw driver in the slot 24, turn the jaw 90°, withdraw it from the seat and replace it with a new one.

It will thus be seen that instead of an expensive replacement of a complete jaw we can provide a relatively cheap and simple jaw insert which may be quickly and easily removed and replaced and has an improved action when in position.

Having thus described our invention in an embodiment thereof we are aware that numerous and extensive departures may be made therefrom without departing from the spirit or scope of the invention as defined in the appended claims.

We claim:

1. A jaw for a chuck having a portion arranged in opposition to a work piece, said portion being provided with a longitudinal seat, a removable work engaging insert disposed in said seat, and means on said insert for engaging the jaw at opposite ends to limit longitudinal movement thereof in the seat.

2. A jaw for a chuck having a portion arranged in opposition to a work piece, said portion being provided with a longitudinal seat, a removable work engaging insert disposed in said seat, and means on said insert for engaging the jaw at opposite ends to limit longitudinal movement thereof in the seat, said work engaging insert having a work engaging surface lying within two planes defined by chords through the jaw insert at one side of the diameter.

3. A jaw for a chuck having a portion arranged in opposition to a work piece, said portion being provided with a longitudinal seat, a removable work engaging insert disposed in said seat, and means on said insert for engaging the jaw at opposite ends to limit longitudinal movement thereof in the seat, said work engaging insert having a work engaging surface lying within two planes defined by chords through the jaw insert at one side of the diameter and being formed with a flat, parallel to the work engaging face and spring pressed means engaging said flat.

4. A chuck jaw having a face arranged for engagement with a work piece, the body of the jaw having a semi-cylindrical seat therein opening through the work engaging face of the jaw, a removable work engaging jaw insert seated in said seat and having end flanges engaging the jaw adjacent the ends of the opening for holding the jaw against longitudinal movement, said jaw insert having a work engaging surface and a seat formed on the jaw diametrically opposite the work engaging surface, spring pressed means engaging said seat for holding said insert resiliently in a predetermined position.

5. A jaw for a chuck comprising a body formed for guided mounting in the chuck and having a face for engagement with a work piece, the body of said jaw being formed with a cylindrical seat opening at one side through the face, a jaw insert comprising a body having a cylindrical surface for seating engagement in said seat and enlarged end flanges for engagement with the jaw body to prevent longitudinal movement of the jaw in the seat and having a work engaging surface defined by removing a portion of the body along a chord, said jaw being insertable in said seat by tilting the body until the removed portion allows it to enter the seat through the open face and afterward to be rotated to seated position, said insert opposite said face being provided with a flat surface parallel to the seat and a plunger having a flat portion for engagement with the seat and spring means for holding said plunger against said surface plunger, said jaw body being formed with a bore opening into said seat and said spring and plunger being disposed in said bore in said body and engaging the flat in the insert.

6. A jaw for a chuck having a face for engagement with a work piece comprising a jaw body and a semi-cylindrical seat formed therein having spaced longitudinal edges defining an opening, a jaw insert movably disposed in said seat and rotatable therein to one position for egress between said spaced edges, and means on said insert for engaging the jaw at opposite ends to limit longitudinal movement thereof in said seat.

7. A jaw for a chuck having a face for engagement with a work piece comprising a jaw body and a semi-cylindrical seat formed therein having spaced longitudinal edges defining an opening, a jaw insert movably disposed in said seat and rotatable therein to one position for egress between said spaced edges, said insert also being movable to a second position to lock said insert within said jaw body, means on said insert for engaging the jaw at opposite ends to limit longitudinal movement thereof in said seat, and spring pressed means interconnecting said jaw and insert being operable to resiliently hold said insert in a predetermined position within said seat.

References Cited in the file of this patent
UNITED STATES PATENTS

| | | |
|---|---|---|
| 1,844,616 | Whiton | Feb. 9, 1932 |
| 1,918,439 | Warman | July 18, 1933 |
| 2,523,374 | Jensen | Sept. 26, 1950 |